April 13, 1948.

W. R. KETCHUM 2,439,543

CITRUS JUICE SCREENER

Filed Oct. 16, 1944

3 Sheets-Sheet 1

INVENTOR
William R Ketchum
By Scott L. Norvell
attorney

April 13, 1948.　　　W. R. KETCHUM　　　2,439,543
CITRUS JUICE SCREENER
Filed Oct. 16, 1944　　　3 Sheets-Sheet 2
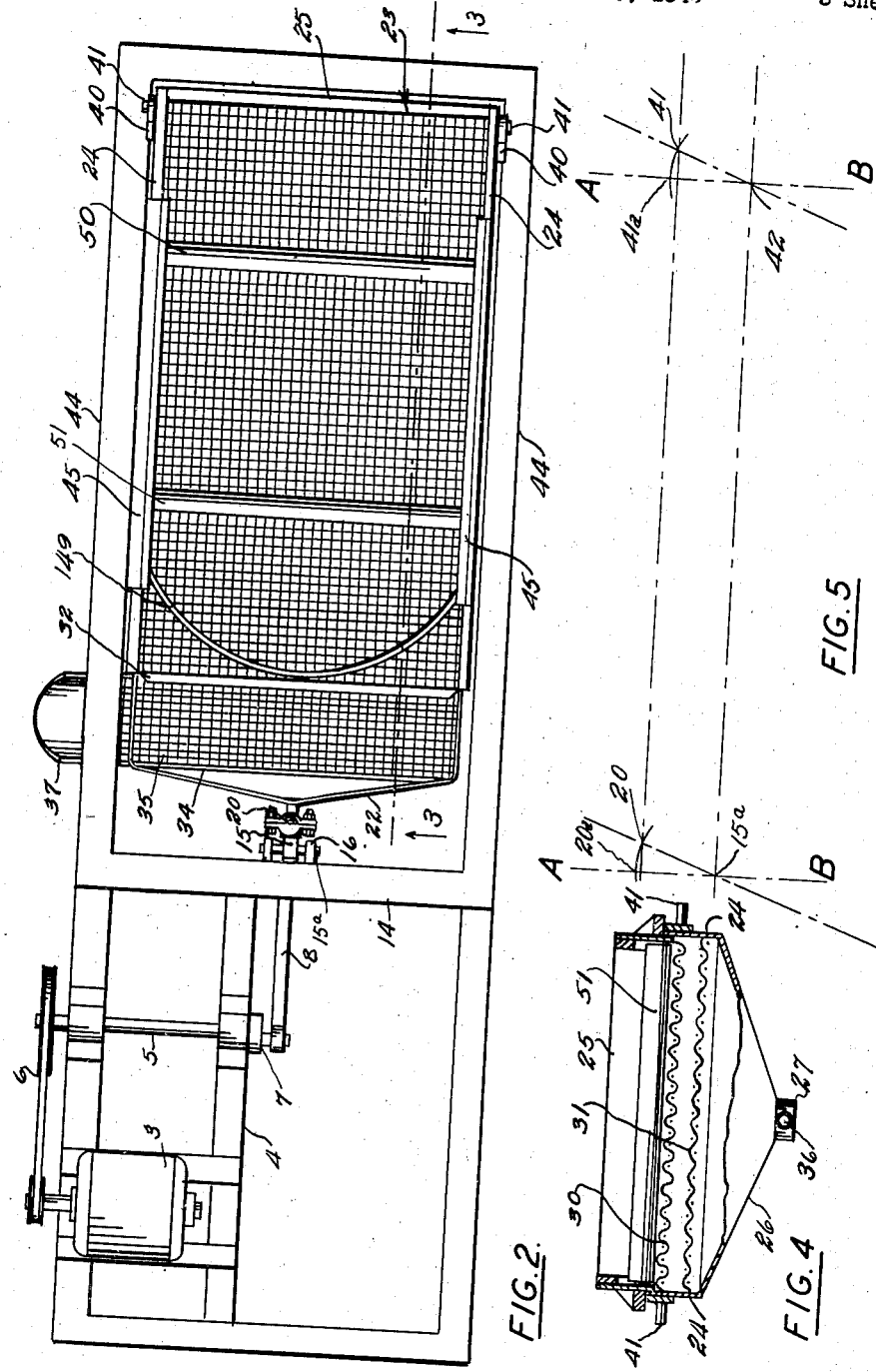
INVENTOR
William R. Ketchum
By Scott L. Norvel
attorney April 13, 1948.　　　W. R. KETCHUM　　　2,439,543
CITRUS JUICE SCREENER
Filed Oct. 16, 1944　　　3 Sheets-Sheet 3

INVENTOR.
BY William R. Ketchum
Dart L. Nowiel
attorney

Patented Apr. 13, 1948

2,439,543

UNITED STATES PATENT OFFICE 2,439,543

CITRUS JUICE SCREENER

William R. Ketchum, Maricopa County, Ariz.

Application October 16, 1944, Serial No. 558,907

3 Claims. (Cl. 210—149)

This invention pertains to screeners for processing citrus fruit juices, is a continuation in part of my prior Patent No. 2,365,883, and has for its objects:

First, to provide a screener wherein the coarse pulp rag and seeds are removed from the freshly extracted juice in the first stage of the device and the finer pulp is removed in the second stage of the device while, coordinately, pulp cells not fully pressed out in the extracting process are subjected to a chafing and pressing action;

Second, to provide a chafing screener wherein the juice pulp mix from the juice extractor is submitted to a chafing process at the same time that it is forced to travel over a screen whereby juices extracted are separated; and juice contained in unbroken cells of the fruit are pressed out and screened;

Third, to provide an oscillating screener for separating citrus juices from fruit pulp wherein the oscillating movement is such as to cause the substances to be treated to travel up an inclined screen at a speed such that the entire juice content is removed before reaching the end of the screen;

Fourth, to provide a device, as above described, wherein the pulp is subjected to a chafing and a controllable pressing action to free any unreleased juice from the fruit cells contained in the unbroken cell segments;

Five, to provide a device in which a screen separator is given an arcuate oscillating movement whereby pulp screened out of citrus fruit juices will travel up an inclined screen; this device having adjustments so that the degree of slant of the screen can be altered and the distance of the stroke of oscillation can be altered to accommodate different types of juices; and A sixth object is, to provide a device, as above stated, in which the pulp, after traversing an inclined screen, in the direction of oscillatory movement of the screen is dropped into a transverse screen and subjected to oscillatory motion in a direction transverse to that first impressed upon it.

Other objects will appear hereinafter.

Figures 1, 3:
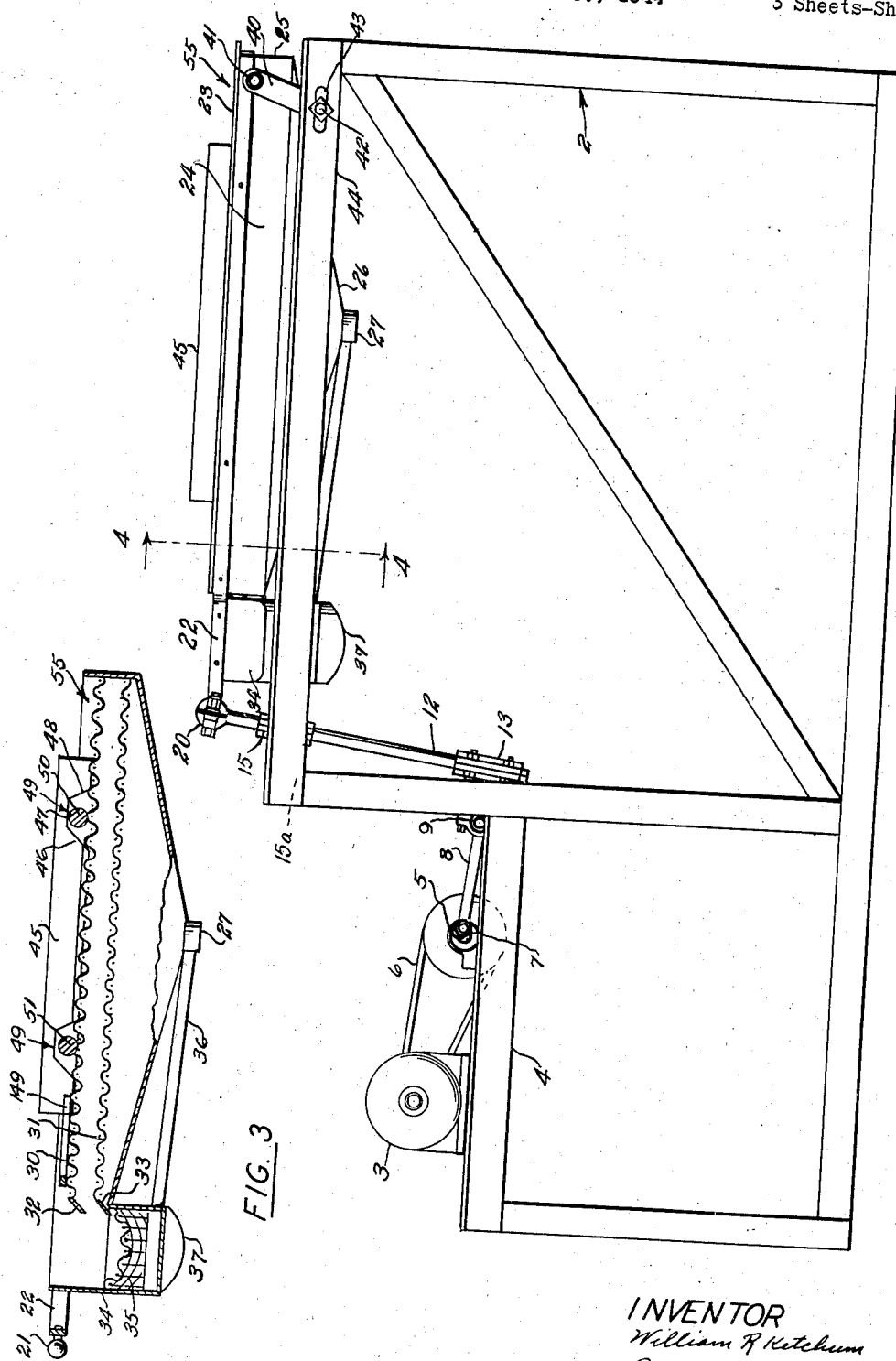

I attain the foregoing objects by means of the machine and mechanism illustrated in the accompanying drawings in which Fig. 1 is a side elevation of the entire machine;

Fig. 2, a plan view thereof;

Fig. 3, a vertical section of the screen and hopper taken on line 3—3, Fig. 2;

Fig. 4, a sectional end elevation taken on lines 4—4, Fig. 1; and

Fig. 5, a diagrammatic view of the movements of the screen.

Figure 6:
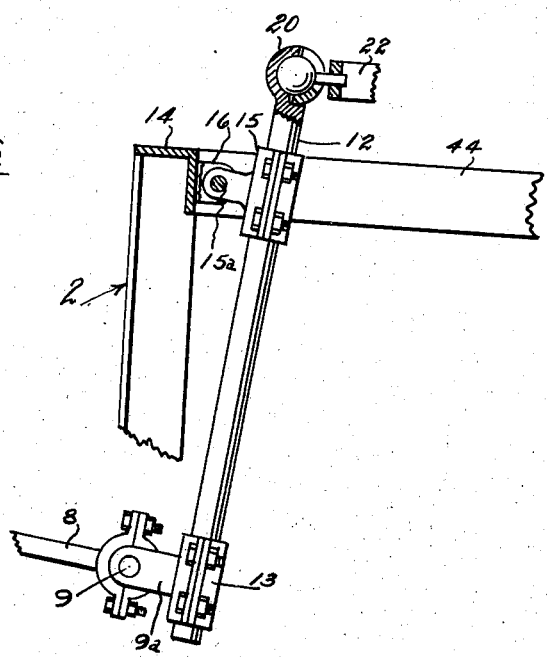

Figure 6 is an elevation of the jigbar and its attachments, drawn on an enlarged scale, and with certain parts sectioned off to show interior construction.

Similar numerals refer to similar parts in all views.

The mechanism is mounted upon a frame generally indicated by numeral 2. At the left end the motor 3 is mounted on a sub-frame 4, and drives the shaft 5 at reduced speed by means of belt and pulley 6. Shaft 5 is provided with a crank 7 to which the left end of connecting rod 8 is attached. The right end of the connecting rod is attached to the lower end of vertical jig bar 12 by means of the clamp 13, which has lugs 9a adapted to receive a connecting rod pin 9.

Bar 12 is pivotally supported to the frame member 14 in the upper part of the main frame 2 by a clamp 15 of substantially the same construction as clamp support 13, hinged to lugs 16 welded to the frame by a bearing pin 15a. Both of these clamps are held in place by bolts and may be positioned at desired positions along bar 12. At the top of this bar is a jig head. This is preferably constructed as a two-part socket 20 retaining a ball 21 attached to the left end of the hopper yoke 22. This yoke is made of light metal bars which extend around the sides and ends of the upper edges of the hopper 23 forming a collar.

The upper part of the hopper has vertical sides 24 and right end 25, but is open at the left end. The lower part is a funnel-shaped transition piece 26 leading to a spout 27.

A coarse screen 30 is positioned within the upper portion of the hopper about two inches from its upper rim. A lower screen 31, of finer mesh, is positioned about an inch below the upper screen. These screens are parallel. They are enclosed on both sides and at the right end by the hopper frame, but are open at the left where they are joined to deposit weirs 32 and 33 respectively. These weirs are positioned above a box-like enclosure forming a juice trap 34. Within this box a basket screen 35 of medium mesh is positioned so that it has a transverse downward slant, opening at the left side of the machine where it is joined to a smooth metal lip 37. The portion of the box structure below this basket screen is closed to receive juice that may be screened through it, and the pipe 36 is connected to its bottom and connects to spout 27.

All the hopper structure is preferably made of stainless steel or other material resistant to acids such as are contained in citrus fruit. The frame structure is preferably made of angle or channel steel cut and welded to the shape shown and dimensions desired.

While the left end of the hopper is supported by the yoke 22 on the upper end of the jig bar 12, the right end is supported on links 40, pivotally attached at its upper end to bosses 41 attached to the hopper collar. These links extend downward and forward at a slight angle and are supported at their lower ends by bearing pins 42 adjustably supported in slots 43 in frame members 44.

On each side of the upper edges of the hopper there are roll retaining members 45, attached by screws to the sides of the upper part of the hopper. The inner adjacent faces of each of these members are provided with recesses 49 to receive the ends of beating rollers 50 and 51, respectively. These recesses have slanting forward faces 46, flat top faces 47, and more steeply slanting rear faces 48. These recesses being positioned on each side of the tray portion of the hopper facing each other form retention means for the transverse beating or chafing rolls 50 and 51 so that they normally rest, beat or chafe on upper screen 30. Roll 50 is approximately one-third of the total length of screen 30 from its right or feed end, and roll 51 about the same distance from the left or discharge end of the screen. These rolls may be made of wood, or acid resistant plastic, or may be made with a wood core and covered with rubber-like material. Each end of each roll is loosely retained within the above described recess so that it is free to move on the screen longitudinally and has a slight vertical play. When the screen is vibrated these rolls move at random within the limits of retention by the recesses. When the roll contacts the forward slanting edge 46 of the recess it is given a rotatory motion clockwise; when in its free motion it contacts the more steeply slanting rear edge 48 it is given a lesser movement of torque counterclockwise. When the machine operates the general tendency of these rolls is to vibrate and slowly rotate in a clockwise direction due to the difference in degree of torque imparted by repeated contacts with the forward and rear recess edges. An arcuate baffle 149 about one-half the roller diameter in height rests on top screen 30 just to the rear of its discharge end. This baffle tends to slow up the leftward motion of pulp on screen 30 and causes it to build up to the right of the baffle. This allows more time for juice drainage and also maintains a blanket of pulp on which roller 51 beats.

In operation, the machine is set up so that the frame is level, whereas the hopper is tilted by adjusting jig bar 12 to give it an upward slant to the left. Material from the juice extractor, consisting of fruit juice, pulp, etc., is deposited on screen 30 at the right end indicated by 55. Motor 3 is started and operated at a speed of approximately 1750 R. P. M. The pulleys and belting provide a speed of about 220 R. P. M. on eccentric shaft 5. Eccentric 7 furnishes oscillating movement through connecting rod 8 and jig rod 12 to the entire hopper assembly. The hopper is thus given a longitudinal oscillatory motion throughout an arc extending to the right of vertical lines AB dropped through the center of the frame bearings 15a and 42 as shown diagrammatically in Figure 5. This motion is therefore generally arcuate following the curves 20—20a and 41—41a, within the upper right hand quadrant, from pivot points 15a and 42; that is, the motion of the hopper upon the supports from the vertical position of the supports to and from a desired limit point toward the feed end of the hopper. The left movement is slightly and arcuately upward; the return motion is arcuately downward. Numerals 20 and 41 on the diagram represent the positions of the correspondingly numbered supporting bearings on the hopper. This arcuate motion causes the screens to forcibly contact, press and lift the pulp on the left upward portion of the oscillation, compressing the mass of pulp against the face of above screens and thereby forcing the juice through the screens. On return motion the inertia of the pulp mass tends to leave it suspended momentarily as the screen rapidly descends and moves to the right. The inertia of the pulp mass not only causes it to be suspended and leave the surface of the screen for the moment but causes it to remain in fixed longitudinal position. Therefore, the screen on its next left-hand motion contacts the mass of pulp at a position slightly to the right of the position where it was contacted on the previous motion. This action is repeated during each oscillation. The result is that, due to the repeated oscillations, the pulp is forced over the screen from right to left. At the same time it is chafed or beaten by repeated contacts with the surface of the screen. Concurrently with this action, the pulp passes under rollers 50 and 51 where it is rolled and beaten by the random sliding and rolling motion of the rolls. At the left end of the screen the pulp mass is dropped into the basket screen 35 where it is chafed in a direction transverse to that on the main screen. This breaks up any compacting and causes further juice extraction. The pulp is finally deposited from the left-hand end of basket screen 35 over lip 37. The screened juice, in the meantime, is collected in the spout 27, from which it may be led to any desired vessel or mechanism.

Aside from the bearings supporting shaft 5 and crank 7, the bearings surfaces at 9, 15a, 20, 41 and 42 are subjected to oscillating movement over but a small portion of their surfaces. I have found it expedient and practical to insert soft rubber bushings, thimbles or coverings in each of these, between the moving surfaces. Clearance for these inserts is provided, and relative motion between the bearing and journal parts is absorbed by the elasticity of the rubber insert. This makes the machine operate more quietly and prevents bearing wear.

The hopper screens are of any suitable mesh, depending upon the quality of the juice supplied and the clarity desired in the finished product.

Heretofore trommel screens have been tried for the purposes here concerned, but have been found undesirable, first, because the juice was aerated too much causing excessive oxidation, and impairing flavor; second, because the pulp was excessively macerated thus releasing certain bitter elements which also impair flavor.

I am aware that vibrating screens of general application have heretofore been produced, but I do not believe the specific construction here disclosed and particularly applicable to the uses here concerned has ever before been disclosed. Therefore, I make the following claims.

I claim:

1. A screener for fruit juices including, in combination, a supporting base, an open top hopper having a rectangular upper portion open at one end and a funnel-like lower part leading to a juice discharge, screens horizontally extending and vertically disposed in the said upper part, the screen portions adjacent the open end of said hopper constituting a discharge, a transversely extending downwardly and outwardly slanting basket screen positioned on said hopper at its discharge end, a juice collecting box positioned below said basket screen connected with said hopper, mechanism on said base to provide a longitudinally horizontal and vertically ascending arcuate motion, including links pivotally attached to said hopper upper part near the closed end, depending therefrom and pivotally mounted on said base at their lower ends, and a jig bar, operably attached to the discharge end of said hopper at its upper end, pivotally supported on said frame at a desired distance therebelow, and attached to a crank at its lower end, together with motive mechanism for operating said crank at a predetermined speed, beating rolls loosely retained in cavities in the lateral edges of said hopper above the upper screen therein, and adapted to bear thereon, and attain rotary motion by contact with the confining sides of said cavities.

2. In a citrus fruit juice and pulp screener, of the type herein described, having a hopper with a horizontally extending screen in the upper part thereof, a rim enclosing the sides and one end of said screen, a feed area being formed at said enclosed end and a pulp discharge at the opposite open end thereof, a juice receptacle formed in the lower part of said hopper below said screen, a supporting frame, vertically extending links and a jig bar pivotally mounted on said hopper and frame adapted to support said hopper on said frame, and a power operated crank operatively connected to said jig bar to provide oscillatory movement for said hopper, in combination with a baffle extending arcuately across said screen adjacent the open discharge end thereof, forming a pulp dam, and beating rolls extending transversely of said screen positioned toward the feed end of said screen relative to said baffle, said rolls being loosely retained in cavities formed in said enclosing rim of said hopper, said cavities having slanting lateral edges adapted to contact the ends of said rolls when said screen is oscillated, the forward cavity edges having a greater degree of slant than the rear cavity edges, whereby the rolls rotate upon and in the direction of the travel of the pulp passing beneath them on said screen.

3. A screener for fruit juices including, in combination, a supporting frame; an open top hopper having a box-like rectangular top with one end removed to form a pulp discharge gate, and one end closed to provide a feed enclosure, a funnel like lower portion leading to a juice discharge pipe, and horizontally extending super-posed screens positioned in the lower portion of said box-like top; means of support for said hopper on said frame adapted to provide a longitudinal and arcuately upward forward motion, and longitudinally and arcuately downward rearward reciprocating motion, including links pivotally mounted on each side of the upper portion of the hopper near the pulp feed end extending downwardly and forward away from said end, and pivotally mounted on the upper portion of said frame, and a substantially vertical jig bar pivotally mounted on said frame at approximately its middle, attached to the middle of the discharge end of said hopper at its upper end and having a lug to receive a connecting rod at its lower end; means for reciprocating said hopper on said supports including a motor mounted on said frame a crank driven thereby and a connecting rod connecting said crank to said lug on the lower end of said jig bar; and beating rolls transversely extending across and normally resting on the topmost screen in said hopper box with the ends thereof loosely retained in cavities in the sides of said box portion of said hopper.

WILLIAM R. KETCHUM.

REFERENCES CITED

The following references are of record in the file of this patent:

UNITED STATES PATENTS

| Number | Name | Date |
|---|---|---|
| 368,356 | Root | Aug. 16, 1887 |
| 2,208,895 | Crabb | July 23, 1940 |
| 2,329,333 | Carter | Sept. 14, 1943 |
| 2,365,883 | Ketchum | Dec. 26, 1944 |

FOREIGN PATENTS

| Number | Country | Date |
|---|---|---|
| 435,854 | Great Britain | July 2, 1934 |
| 592,401 | France | Apr. 30, 1925 |